United States Patent [19]

Murphy

[11] Patent Number: 4,728,346
[45] Date of Patent: Mar. 1, 1988

[54] PERMEATION MODIFIED ASYMMETRIC GAS SEPARATION MEMBRANES HAVING GRADED DENSITY SKINS

[75] Inventor: Milton K. Murphy, Clayton, Mo.

[73] Assignee: Permea Inc., St. Louis, Mo.

[21] Appl. No.: 897,162

[22] Filed: Aug. 15, 1986

[51] Int. Cl.$^4$ .............................................. B01D 53/22
[52] U.S. Cl. ......................................... 55/158; 55/16; 264/177.14; 264/178 F
[58] Field of Search .............................. 55/16, 68, 158; 210/490, 500.38, 500.41; 264/177.14, 178 F

[56] References Cited

U.S. PATENT DOCUMENTS

| | | | |
|---|---|---|---|
| 3,551,331 | 12/1970 | Cescon et al. | 210/500.38 X |
| 3,615,024 | 10/1971 | Michaels | 210/490 |
| 3,709,774 | 1/1973 | Kimura | 210/490 X |
| 3,752,784 | 8/1973 | Jenkins | 260/2.5 R |
| 3,762,136 | 10/1973 | Kimura | 55/158 |
| 3,792,135 | 2/1974 | Brown et al. | 264/41 |
| 3,880,763 | 4/1975 | Chapman et al. | 210/490 |
| 3,917,777 | 11/1975 | Asada et al. | 264/41 |
| 3,950,257 | 4/1976 | Tshii et al. | 210/500 |
| 3,980,456 | 9/1976 | Browall | 55/158 |
| 4,029,582 | 6/1977 | Ishii et al. | 55/158 X |
| 4,157,960 | 6/1979 | Chang et al. | 210/500.41 X |
| 4,230,463 | 10/1980 | Henis et al. | 55/16 |
| 4,351,860 | 9/1982 | Yoshida et al. | 427/246 |
| 4,364,759 | 12/1982 | Brooks et al. | 55/158 X |
| 4,472,175 | 9/1983 | Malon et al. | 55/158 X |
| 4,527,999 | 7/1985 | Lee | 55/158 X |
| 4,544,484 | 10/1985 | Sundet | 210/500.2 |
| 4,568,579 | 2/1986 | Watson | 55/158 X |
| 4,575,385 | 3/1986 | Brookset al. | 55/158 |
| 4,595,503 | 6/1986 | Schindler et al. | 210/500.38 |
| 4,612,119 | 9/1986 | Eguchi | 210/500.41 X |
| 4,629,563 | 12/1986 | Wrasidlo | 210/500.38 X |

FOREIGN PATENT DOCUMENTS 24305 2/1983 Japan .

OTHER PUBLICATIONS

T. Tweedle, O. Kutowy, W. Thayer, and S. Sourirajan, Ind. Eng. Chem., Prod. Res. Dev., 22, 320 (1983), Polysulfone Ultrafiltration Membranes.
V. Gutmann Solvent Concepts, Chemtech, Apr. 1977, pp. 255–263.

Primary Examiner—Robert Spitzer
Attorney, Agent, or Firm—Henry Croskell

[57] ABSTRACT

Asymmetric gas separation membranes having graded density skins and macrovoid-free morphology comprised of glassy, hydrophobic polymers which when contacted on the graded density skin surface with an effective amount of permeation modifier and a coating in occluding contact, exhibit permeation selectivities greater than the intrinsic permeation selectivities for at least one gas of a gaseous mixture than a bulk sample of the polymers. The permeation modified membranes have increased free volume as evidenced by the membrane first heat $T_g$ which is greater than the $T_g$ of the bulk sample of the glassy, hydrophobic polymers; however the permeation modified membranes having an effective amount of permeation modifier added in non-uniform mode are achieved without significant loss in the physical properties of the membrane, including $T_g$.

37 Claims, No Drawings

PERMEATION MODIFIED ASYMMETRIC GAS SEPARATION MEMBRANES HAVING GRADED DENSITY SKINS

This invention relates to permeation modified graded density skin, asymmetric gas separation membranes which exhibit significantly enhanced gas separation selectivities and increased permeabilities when combined with a coating in occluding contact with the graded density skin. In another aspect, the invention relates to a process for permeation modifying the graded density skin, asymmetric gas separation membranes.

The separating, including upgrading of the concentration of at least one selective gas from a gaseous mixture, is an especially important process in view of the demands and the supplies of chemical feedstocks. Frequently these demands are met by separating one or more desired gases from gaseous mixtures and utilizing the gaseous products for processing. Applications have been made employing separation membranes for selectively separating one or more gases from gaseous mixtures. To achieve selective separation, a membrane exhibits less resistance to transport of one or more gases than of at least one other gas of the mixture. Thus, selective separation can provide preferential depletion or concentration of one or more desired gases in the mixture with respect to at least one other gas and therefore provide a product having a different proportion of the one or more desired gases to the at least one other gas than the proportion in the mixture. However, in order for selective separation of the one or more desired gases by the use of separation membranes to be technically feasible the membranes must satisfy several criteria so that the use of the separation process has utility. For instance, the membranes must be capable of withstanding the conditions to which they may be subjected during the separation operation. The membranes must also provide an adequately selective separation of one or more desired gases at sufficiently high fluxes, that is, permeation rate of the permeate gas per unit surface area. Thus, separation membranes which exhibit a high flux but low selectivity separation are unattractive as they require multistaging. Similarly, separation membranes which exhibit adequately high selective separation but undesirably low fluxes are also lacking in practical use feasibility as they require large separating membrane surface areas. Furthermore, membranes which are not capable of maintaining the desired performance of flux and selectivity over an extended period of time in adverse operating environments are likewise undesirable. Adverse environmental conditions include extremes of temperature, pressure and concentration of chemical contaminants. Accordingly, research has continued to develop gas separation membranes which provide improved performance regarding the separation of one or more desired gases from a mixture of gases for an extended period of time under adverse environmental conditions.

The passage of gas through a membrane can proceed through pores, i.e. continuous channels for gas flow in communication with both feed and exit surfaces of the membrane. Small diameter pores may be capable of separating gases by Knudsen flow or diffusion. In another mechanism, in accordance with current views of gas separation membrane theory, the passage of a gas through the membrane may be by interaction of the gas with the material of the membrane. In this latter postulated mechanism, the permeability of a gas through a membrane is believed to involve the solubility of the gas in the membrane material and the permeability constant for a single gas is presently viewed as being the product of the solubility and diffusivity of the gas in the membrane. A given membrane material has a particular permeability constant for the passage of a given gas by the interaction of the gas with the material of the membrane. The rate of permeation of the gas, i.e. flux through the membrane is determined by the permeability constant, and is also dependent on variables such as the physical nature of the membrane, membrane thickness, the partial pressure differential of the permeate gas across the membrane, the temperature and the like.

In general, efforts have been directed at developing membranes for gas separation in as thin a form as possible in view of the low permeabilities of most membrane materials in order to provide adequate fluxes while providing a membrane as pore-free as possible such that gases are passed through the membrane by interaction with the material of the membrane, thus achieving more efficient gas separation. One measure of membrane efficiency is the separation factor which is the ratio of the permeability constant of one gas to the permeability constant of another gas.

One approach for developing separation membrane suitable for gaseous systems has been to provide asymmetric membranes having the thinnest possible separation layer (skin) supported on a porous substructure where the ultrathin separating layer provides the desired separation. The separation layer is advantageously sufficiently thin, i.e. ultrathin, to provide reasonable fluxes. The essential function of the porous substructure is to provide mechanical support to the separating layer. Suitable substructures are desirably porous to provide low resistance to permeate passage after the separating layer has performed its function of selectively separating the permeate from the feed mixture. Such asymmetric hollow fiber gas separation membranes spun from polymeric materials having high intrinsic selectivities for gas separations such as polyphenylene oxides, substituted polyphenylene oxides, polyimides, polyamides, polysulfones, polyethersulfones, cellulose esters, and the like, fail to provide suitable separation systems for gas separation as porosity in the separation layer (skin) results in low selectivity, compared to the selectivity of the material of the asymmetric membrane.

Broader application of this technology can be achieved if membranes can be perfected i.e., surface porosity eliminated to provide a membrane which separates gas more efficiently. A perfect, non-porous asymmetric membrane can achieve a separation factor equal to the intrinsic separating factor of the material of the asymmetric membrane.

Research efforts continue to reach economic gas separation performance utilizing asymmetric membranes of materials which have intrinsically high separation selectivity for gases such as hydrogen, carbon dioxide and the like by attempts to eliminate surface porosity of these asymmetric membranes by using either spinning or post treatment techniques. These attempts have generally resulted in membranes, particularly hollow fiber membranes, that have poor performance for gas separations either in low flux or low selectivities or both.

A major improvement in gas separation membranes is disclosed by Henis et al. in U.S. Pat. No. 4,230,463 which pertains to particular multicomponent membranes for gas separations comprising a coating in contact with the porous separation membrane wherein the separation properties of the multicomponent membranes are principally determined by the material of the porous separation membrane as opposed to the material of the coating. Such multicomponent membranes for the separation of at least one gas from a gaseous mixture can exhibit a desirable selectivity approaching the intrinsic selectivity of the material of the membrane and still exhibit a useful flux. Moreover, such multicomponent membranes for gas separation can be fabricated from a wide variety of polymeric materials which are advantageous for a given gas separation. The desired combination of flux and selectivity of separation can be provided by the configuration and methods of preparation and combinations of the components. For instance, material having high selectivity of separation but a relatively low permeability constant can be utilized to provide multicomponent membranes having desired permeation rates and desired selectivity of separation through utilization of a porous substrate which contributes to the overall separation efficiency of the multicomponent membrane.

Another approach for developing separation membranes suitable for gaseous systems has been to provide composite membranes having the thinnest possible superimposed membranes supported on a porous support where the superimposed ultrathin membrane provides the desired separation. The superimposed membranes are advantageously sufficiently thin, i.e. ultrathin, to provide reasonable fluxes. The essential function of a porous support is to mechanically support the superimposed membrane. Suitable supports are desirably porous to provide low resistance to permeate passage after the superimposed membrane has performed its function of selectivity separating the permeate from the feed mixture. Klass et al., U.S. Pat. No. 3,616,607; Stancell et al., U.S. Pat. No. 3,657,113; Wasuda, U.S. Pat. No. 3,775,308; and Browall, U.S. Pat. No. 3,980,456 exemplify gas separation membranes having superimposed thin membranes on a porous support.

Such composite membranes for gas separations have not been without problems. For instance, Browall discloses that in the fabrication of composite membranes of ultrathin films, fine particles, particles below about 3,000 angstroms in size, may be deposited under or between preformed ultrathin membrane layers and because of their large size in comparison to the ultrathin membranes, puncture the ultrathin membranes. Such breaches reduce the selectivity and thus the effectiveness of the membrane. The Browall patent discloses applying a preformed organopolysiloxanepolycarbonate copolymer sealing material over the ultrathin membrane to cover the breaches caused by the fine particles. Browall also discloses employing a preformed layer of the organopolysiloxane-polycarbonate copolymer between the ultrathin membranes and the porous polycarbonate support as an adhesive. Thus, the composite membranes of Browall are complex in materials and techniques of construction.

Research efforts in the field of gas separation technology to reach economic gas separation performance have been directed at providing materials for the construction of gas separation membranes which have high intrinsic separation factors. New materials, chemically modified materials, and homogeneous blends have been developed to achieve high intrinsic separation factors. Various methods to alter the permeability and selectivity of polymeric materials are known. Chemical modifications of polymeric material alter the permeability and selectivity of these materials. For example, reaction of a brominated poly(xylene oxide) membrane with trimethylamine or thiourea alters the permeabilities and separation factors of the polymeric membrane, Henis and Tripodi, U.S. Pat. No. 4,230,463.

Permeation modifiers have been found to be effective in raising separation factors above the intrinsic separation factors of recently developed asymmetric gas separation membranes which have graded density skins as disclosed in copending U.S. patent applications assigned to Permea, Inc. having Permea, Inc. identification numbers of 36-21(5423)A and 36-21(5429)A filed on Aug. 15, 1986. These two patent applications, Ser. No. 896,990, and Ser. No. 897,566, are hereby incorporated by reference.

Robeson describes $CO_2$ permeability changes of polysulfone by homogeneously blending the polymer with antiplasticizers, e.g., chlorinated biphenyl, N-phenyl-2-napthylamine, and 4,4'-dichlorodiphenylsulfone, *Poly. Eng. & Sci.*, July 1967, Vol. 9, No. 4, pp. 277–281. The production of asymmetric membranes, Loeb-Sourarijan-type membranes, from blends of polymers with low molecular weight materials to obtain membranes exhibiting good selectivity and a good permeation rate has been found to be extremely difficult. Most attempts result in membranes which are either porous, i.e., have continuous channels through the skin, and have low selectivity, or which have too thick a skin to give useful permeation rates. Blending of polymers with low molecular weight materials affects the physical properties of the polymeric materials. Blending of a polymer with antiplasticizers or with small concentrations of plasticizers result in rigidity and brittleness of the polymeric material, in reduced impact strength and ductility, and in reduced $T_g$ (glass transition temperature) of the polymeric blend.

More recently, Brooks et al in U.S. Pat. No. 4,575,383 have taught permeation modified gas separation membranes. Asymmetric gas separation membranes of polymeric materials having selective permeation of one gas of a gaseous mixture were found to exhibit improved permeation selectivities for the one gas when the membranes had been contacted on one or both surfaces with an effective amount of permeation modifier. The permeation modifier was added in small quantities to the preformed membranes such that the general physical properties of the membrane were unaltered; however, the increased permeation selectivities were at the expense of lowered permeabilities.

Thus, the quest for more suitable materials and more suitable methods to improve membrane separation efficiency continues.

SUMMARY OF THE INVENTION

The invention provides asymmetric gas separation membranes having graded density skins and macrovoid-free morphology which are comprised of glassy, hydrophobic polymers and when contacted on the graded density skin with an effective amount of a permeation modifier exhibit selectivities greater than intrinsic selectivities achieved with a bulk sample of the polymers. This greater than intrinsic selectivity or separation factor for one gas of a gaseous mixture is achieved with permeabilities which are greater than, for example, those taught by Brooks et al for the same polymers when in both cases any defects of the membrane have been corrected by a coating material in occluding contact with the surface of the graded density skin of the membrane. A preformed asymmetric gas separation membrane having a graded density skin and macrovoid-free morphology and increased free volume comprised of polymeric material having selective permeation of at least one gas of a gaseous mixture over that of one or more remaining gases of the gaseous mixture has been found to exhibit separation factors greater than the intrinsic separation factor of the material of the separation membrane for the permeating gases after being contacted with an effective amount of a permeation modifier in combination with one or more coatings in a multicomponent gas separation structure. The asymmetric gas separation membrane having graded density skin is permeation modified in a non-uniform mode across the membrane wall. The invention also provides for a process to produce the improved flat, tubular or hollow fiber graded density skin, asymmetric membranes having enhanced gas separation properties, i.e., a separation factor greater than the intrinsic separation factor of the material of the separating membranes. It has been discovered that treating graded density skin, asymmetric gas separation membranes with permeation modifiers results in a modified membrane having a separation factor greater than the intrinsic separation factor exhibited by the material of the asymmetric membranes before permeation modifier treatment. The non-uniform distribution of the permeation modifier across the wall of the asymmetric separation membrane results in a modified membrane having a separation factor greater than the intrinsic separation factor exhibited by the material of the membranes before permeation modifier treatment. The non-uniform distribution of the permeation modifier across the wall of the graded density skin, asymmetric separation membrane results in significant changes in the separation properties of the membrane accompanied by only slight or no change in the physical properties of the membrane as exhibited by $T_g$ measurement.

DEFINITION OF TERMS

In accordance with this invention, the permeation modified asymmetric, graded density skin membranes exhibiting improved gas separation selectivity are comprised of a preformed membrane and a permeation modifier material in contact with the graded density skin of the asymmetric membrane in combination with a coating in a multicomponent gas separation membrane structure.

For purposes of defining the invention, the following terms and phrases will have the meanings as set out below.

In accordance with the invention, the asymmetric gas separation membranes are comprised of a graded density skin, that is, a skin which exhibits maximum density at the surface which is farther from the porous substructure. The separation membrane is essentially the same material throughout its structure, i.e., the asymmetric separation membrane is substantially chemically homogeneous, as is the graded density skin. The material of the separation membrane exhibits selective permeation for at least one gas of a gaseous mixture over that of at least one remaining gas of the mixture, hence the separation membrane is defined as a "separation" membrane. By describing this separation membrane as asymmetric, it is meant that the membrane has a thin, dense skin supported by a thick, porous substrate (matrix) in which both layers are formed from a single sol by a phase inversion process. The phase inversion process is a general process of membrane manufacture that utilizes a sol which inverts into two interdispersed liquid phases, that is, polymer coated micelles of the dispersed phase in a continuous second liquid phase, prior to, or simultaneously with gelation, at which time the emulsoid nature of what once was a sol is immobilized as a gel. The membranes of this invention advantageously provide the separation of at least one gas from a gaseous mixture by interaction with the materials of the separation membrane, enhanced by free volume and graded density compared to that of separation membranes having denser effective separation skin.

The asymmetric membranes having graded density skins and macrovoid-free morphology are further enhanced for practical utilization for separating gases when the graded density skin is coated with coatings which have a particular relationship respective to the membranes. Some of these relationships can conveniently be stated in terms of relative separation factors and permeabilities with respect to a pair of gases for the separation membranes and the coatings.

The coating may be in the form of an essentially non-interrupted membrane, i.e., an essentially non-porous membrane, in contact with the graded density skinned membrane, or the coating may be discontinued, or interrupted. When the coating is interrupted, it is sometimes referred to as an occluding material since it may occlude channels for gas flow, i.e., pores. Preferably the coating is not so thick as to adversely affect the performance of the graded density skinned membrane, e.g., by causing an undue decrease in flux or by causing such a resistance to gas flow that separation factor of the coated membrane is essentially that of the coating. Often the coating may have an average thickness of up to about 10 micrometers.

A separation factor ($\alpha a/b$) for a membrane for a given pair of gases a and b is defined as the ratio of the permeability constant ($P_a$) of the membrane for gas a to the permeability constant ($P_b$) of the membrane for gas b. A separation factor is also equal to the ratio of the permeability ($P_a/l$) of a membrane of thickness l for a gas of a gaseous mixture to the permeability ($P_b/l$) of the same membrane to gas b, wherein the permeability for a given gas is the volume of gas, standard temperature and pressure (STP), which passes through a membrane per square centimeter of surface area, per second, for a partial pressure drop of 1 centimeter of mercury across the membrane per unit of thickness, and is expressed as $P/l = cm^3/cm^2\text{-sec-cmHg}$.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors are disclosed by Hwang, et al., *Techniques of Chemistry*, Volume VII, *Membranes in Separations*, John Wiley & Sons, 1975 (herein incorporated by reference) at Chapter 12, pages 296 to 322.

An intrinsic separation factor as referred to herein is the separation factor for a material which has no channels for gas flow across the material, and is the highest achievable separation factor for the material. Such a material may be referred to as being continuous or non-porous. The intrinsic separation factor of a material can be approximated by measuring the separation factor of a compact membrane of the material. However, several difficulties may exist in the determination of an intrinsic separation factor including imperfections introduced in the preparation of the compact membrane such as the presence of pores, the presence of fine particles in the compact membrane, undefined molecular order due to variations in membrane preparation, and the like. Consequently, the determined intrinsic separation factor can be lower than the intrinsic separation factor. Accordingly, a "determined intrinsic separation factor" as employed herein refers to the separation factor of a dry compact membrane of the material.

Dense, as in dense film refers to the absence of voids $>\sim 5$ angstroms in diameter within the typical structure. However, the thin skins of integrally-skinned membranes, although dense on the whole, invariably contain a few large defects which must be sealed if intrinsic $\alpha$ is to be obtained.

An asymmetric or an integrally-skinned membrane is a two or more layered membrane of the general class first prepared by Loeb-Sourirajan consisting of a thin dense skin supported by a thick porous substructure (matrix) in which both layers are formed from a single sol by a phase inversion process.

For purposes of this invention a permeation modifier is defined as any material which increases separation factor of any graded density skin, asymmetric gas separation membrane when contacted in an effective amount on one or both surfaces of the membrane. The membrane modification is accomplished by non-uniform distribution of the permeation modifier across the membrane wall without loss of mechanical properties of the membrane as exhibited by insignificant or no loss in membrane $T_g$. The increased separation factor resulting from the effective amount of permeation modifier is greater than the intrinsic separation factor of the material comprising the graded density skin, asymmetric gas separation membrane.

An "effective amount" of permeation modifier as referred to herein is used in relation to the amount of modifier contacted with the asymmetric gas separation membrane. This effective amount can be varied by factors such as modifier concentrations, time of exposure, temperature and the like. An effective amount is herein defined as that modifier contact amount sufficient to improve the asymmetric gas separation membrane selectivity but insufficient to impair the mechanical integrity, strength, or other physical properties of the membrane which are detrimental to the function of the membrane as a gas separator.

First heat $T_g$ is recorded at the first excursion of a differential scanning calorimetry (DSC) sample through the $T_g$ range and may differ from that obtained in subsequent heats. If the first heat $T_g$ is higher than that of the bulk polymer, and no crosslinking, etc. has occurred, it is evidence that the sample contained a free volume higher than that of the bulk polymer. If the first heat $T_g$ is lower, the presence of residual solvent may be indicated. All of the information relative to increased free volume in a given membrane is lost after the first heat since increased segmental mobility at the $T_g$ leads to loss of excess free volume.

Free volume ($V_f$) is the volume in a dense film which is available for gas permeation; $V_f=V_t-V_o$ where $V_t$=total macroscopic volume and $V_o$=volume occupied by vibrating macromolecules. The $V_f$ fraction in a typical glassy polymer is $\sim 0.025$ at its $T_g$.

Glass transition temperature ($T_g$) is the temperature at which the thermal expansion coefficient changes during the course of proceeding from the glassy to the rubbery state. The viscosity at the $T_g=10^{13}$ poises. Theoretically at a value of 51.6° C. below the $T_g$, the viscosity becomes infinite. The first heat $T_g$ increases with increasing $V_f$.

Macrovoids—the large (10–100 $\mu$m) diameter voids found with the normal sponge-like matrix which itself consists of small 0.1–2 $\mu$m diameter open cells. Macrovoid-containing membranes such as those utilized for ultrafiltration by Tsugaya et al are unsuitable for gas separations. The asymmetric gas separation membranes having graded density skins are macrovoid-free or essentially macrovoid-free membranes. Macrovoids originate from sols which are metastable at the sol gel transition as a result of being too fluid or too far removed from the point of incipient gelation (PIG) so that sol inhomogeneities can arise which are then frozen into the membrane structure after gelation as discussed by R. E. Kesting, *Synthetic Polymeric Membranes—A Structural Perspective*, 2nd Edition, Wiley-Interscience, 1985.

Permeability (P) is the rate at which a gas traverses a membrane $$P = \frac{\text{vol} \cdot \text{thickness}}{\text{time} \cdot \text{area} \cdot \text{pressure}} = \frac{\text{cc(STP)cm}}{\text{sec cm}^2 \text{ cm Hg}}$$

P is also expressed as P/l (P÷thickness) to remove any uncertainties as to actual skin thickness.

Phase inversion is the general process of membrane manufacture that utilizes a sol which inverts into two interdispersed liquid phases; polymer coated micelles of the dispersed phase in a continuous second liquid phase, prior to, or simultaneously with, gelation at which time the emulsoid nature of what once was a sol is immobilized as a gel.

Potential is the unrealized capacity for exhibiting a certain property. The potential for efficient gas separation means that the uncoated membrane has sufficient fineness and uniformity of structure and sufficient free volume in the skin, that after coating with a permeable polymer, defects will be sealed and the fiber will yield high permeabilities and approach intrinsic selectivity.

Skin is the thin ($\sim 2500$Å) dense layer observable with scanning electron microscope (SEM) which is found in integrally-skinned (asymmetric) membranes. A skin can be of uniform density in which case the skin and active separating layer are identical, or it can be of graded density in which case the active layer thickness is less than the skin thickness.

Preferred hydrophobic materials or polymers as used in this description refer to water absorption values of between 0.02% and 1.0% after immersion in water for 24 hours of the materials or polymers as determined by ASTM D-570 6.1 standards; however, it is possible that other hydrophobic materials and polymers with higher water absorption value could be formed into the membrane morphologies of this invention.

Wet process is that variation of phase inversion in which gelation occurs as the result of incompatibility which is effected by the immersion of the sol in a nonsolvent gelation medium such as water.

DETAILED DESCRIPTION OF THE INVENTION

I have found that asymmetric gas separation membranes having graded density skin and macrovoid-free morphology comprised of glassy, hydrophobic polymers and having increased free volume, when contacted on the graded density skin with an effective amount of a permeation modifier, offer significantly enhanced gas separation selectivity and increased permeability. Permeation modification of the preformed membranes provides a simple route to improving gas separation membrane performance to such a level that the permeation modified membranes perform at separation levels greater than the intrinsic selectivity of the polymer from which the fiber is spun.

Permeation modification of a preformed graded density skin, asymmetric gas separation membrane, in combination with a coating in a multicomponent gas separation membrane structure, provides an improved gas separation membrane wherein the separation factor for at least one pair of gases is higher than the intrinsic separation factor of the material of the membrane for permeating gases.

Permeation modified asymmetric gas separation membranes having graded density skins and macrovoid-free morphology comprised of glassy, hydrophobic polymers wherein the membranes have increased free volume as evidenced by the membrane first heat $T_g$ which is greater than the $T_g$ of a bulk sample of the glassy, hydrophobic polymers are presented by the invention wherein the membranes exhibit high permeabilities and greater than intrinsic separation factors realized after the porous defects of the membrane are sealed with a highly permeable silicone polymer or similar coating materials. The permeation modified membranes exhibit selectivities greater than those of dense films of the polymers and permeabilities which are greater than those of state-of-the-art, asymmetric membranes of the same polymer, for example, as taught by Henis et al.

The membranes having graded density skins can result from, for example, spinning or casting dopes comprised of glassy, hydrophobic polymers in a solvent system of a Lewis acid, a Lewis base and a Lewis acid:-base complex. The solvent system is capable of dissolving the polymer and being readily disassociated by polar coagulation medium and provides macrovoid-free, asymmetric membranes which possess high free volume and graded density skins. The invention is concerned with the preparation and modification of efficient, asymmetric, gas separation membranes from glassy, hydrophobic polymers. The permeabilities of the inventive membranes are greater than the Henis et al membranes while separation factors are significantly enhanced, i.e., greater than intrinsic levels. The reason for the greater permeability in the graded density skin membranes lies in the increased free volume in their skin regions which in turn is a result both of sol structure prior to gelation and of the kinetics of gelation and desolvation of the sols from which the membranes are spun or cast. The skins of the inventive membranes exhibit a density gradient, becoming less dense with increasing proximity to the skin/matrix interface. The densest portion of the graded density skin, the skin of the skin, is effectively as dense as a thick dense film and hence exhibits without modification essentially the same or intrinsic separation factor as the thick dense film once porous defects have been sealed by coating. The as-spun membranes have a fine and uniform structure which when contacted with an effective amount of permeation modifier achieves greater than intrinsic separation factor. This potential is realized after any porous defects have been filled with highly permeable silicone polymer or equivalent coating material.

The membranes are a result of processes involving viscous sols which are close to the point of incipient gelation. The sols can consist of an aromatic sulfone polymer, for example, polysulfone, polyphenylsulfone, polyethersulfone and the like dissolved in a solvent system consisting of a Lewis acid, Lewis base and Lewis acid:base complex. The fact that the Hildebrand parameter of the solvent system is reasonably close to that of the polymer results in fine and homogeneous sol and hence gel structures which have the potential for high gas separation efficiency. High sol viscosity and low nonsolvent tolerance kinetically hinder densification of the gel and prevent the formation of macrovoids. At gelation, the Lewis acid:base complexes are rapidly disassociated by a coagulation medium into their smaller component molecules which, together with any original uncomplexed acid and base components, are readily extracted during gelation and washing steps. All of these factors act in concert to increase the rates of gelation and desolvation and to minimize densification with the end result that unusually high free volume and graded densities are maintained in the skin layers of the membranes.

One simple method for contacting and modifying the graded density skin, asymmetric membranes with a permeation modifier is to dip the asymmetric hollow fiber membranes in a solution of the permeation modifier at varying concentrations and temperatures. In order to achieve an effective amount of the modifier in contact with the asymmetric membranes, these contacts must be considered independently depending on the materials comprising the permeation modifiers being used and the polymeric materials comprising the asymmetric membrane.

Preferably, graded density skin, asymmetric hollow fiber membranes are first prepared and then immersed in a solution containing a permeation modifier. Preferably, the membrane is essentially insoluble in the solvent for the permeation modifier. Contact with the solution of permeation modifier is continued until an effective amount of permeation modifier is absorbed by the asymmetric membrane. The contact time may be as long as one hour or more, but typically contact times of about 1–10 minutes are sufficient. Longer contact times result in greater absorption of the permeation modifier. One advantage of treating a preformed asymmetric hollow fiber membrane is that the permeation modifier is rapidly absorbed by the graded density skin with relatively little absorption of the permeation modifier by the bulk of the polymeric material of the asymmetric hollow fiber membrane. Thus, the total weight of permeation modifier absorbed generally will be less than about one weight percent of the total weight of the membrane, but the concentration of permeation modifier in the graded density skin of the membrane can be considerably higher, for example, about 10 to about 20 weight percent. In a preferred embodiment of the invention, essentially only the graded density skin of the hollow fiber is modified.

The non-uniform distribution of the permeation modifier across the wall of the asymmetric separation membrane results in significant improvements in the separation properties of the membrane accompanied by only slight or no changes in the physical properties of the membrane as exhibited by insignificant or no loss in $T_g$ of the membrane.

The effective amount of permeation modifier, i.e., the amount of permeation modifier contacted in a non-uniform distribution across the wall of the asymmetric membrane is that which is sufficient to improve the selectivity of the membrane, but insufficient to impair the mechanical integrity, strength, or other physical properties of the membrane which are detrimental to the function of the membrane as a gas separator, and varies depending upon the nature of the polymeric material of the asymmetric membrane and the degree of permeation selectively desired. Changes in separation factor may be achieved over a wide range of proportions of permeation modifier to polymeric material of the membrane. Satisfactory effective amounts of permeation modifier include from about 0.01 to about 1.0 weight percent modifier based on the weight of polymeric material of the membrane. When modifying a preformed graded density skin, asymmetric hollow fiber membrane, the concentration of the treating solution containing the permeation modifier or the time of exposure to the treating solution is controlled so that the graded density skin of the asymmetric hollow fiber membrane absorbs the effective amount of permeation modifier.

Useful permeation modifiers according to the invention can be selected from, but not limited to, materials which are aromatic, rigid and polar which exhibit antiplasticization effects in the effective amount range.

In accordance with one embodiment of this invention, improved asymmetric membrane for gas separation is obtained by modifying said asymmetric membrane by an effective amount to increase the gas separation factor of the asymmetric membrane, by a permeation modifier of the formula:

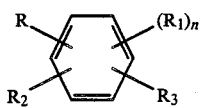
(a)

in which n is one to three, R and $R_1$ independently are hydroxy, chloro, bromo, amino, alkylamino, dialkylamino, nitro, alkoxy, hydroxyalkyl, hydroxyalkoxy, carboalkoxy, carboalkyl, or glycidyloxy, and $R_2$ and $R_3$ independently are hydrogen or alkyl, or;

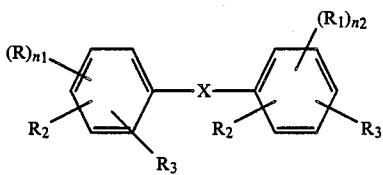
(b)

in which R, $R_1$, $R_2$, $R_3$ are the same as before, X if it exists is oxygen, sulfur, dithio, carbonyl, alkylene or cycloalkylene, and $n_1$ and $n_2$ are zero to three with the proviso that the sum of $n_1$ and $n_2$ is at least two.

These permeation modifiers (a,b) can be selected from benzene, diphenyl, benzophenone, diphenylether, diphenylsulfide, diphenyldisulfide, diphenylalkane, and diphenylcycloalkane substituted with at least two polar groups and optionally with alkyl groups. Satisfactory alkylene bridging groups of the diphenylalkane compounds include straight or branched chain alkylene radicals of 1–12 carbon atoms with alkylene radicals of 1–6 carbon atoms being preferred. Suitable cycloalkylene bridging groups include cycloalkylene radicals of 5–8 carbon atoms with cyclohexylene being preferred. Suitable alkyl radicals, either directly attached to the benzene ring or comprising a part of alkoxy, alkylamino, or diamino radicals, include straight or branched alkyl radicals of 1–12 carbon atoms. Primary and secondary alkyl radicals are preferred with lower alkyl radicals of 1–5 carbon atoms being more preferred.

Illustrative examples of satisfactory permeating modifiers of formula (a) are 3-bromophenol, 2,6-dibromophenol, resorcinol, 4-chlorophenol, 4-nitrophenol, 4-aminophenol, 1-bromo-4-nitrobenzene, 4-chloroaniline, 4-nitroaniline, 1-bromo-4-chlorobenzene, catechol, 2,6-dichlorophenol, 2,6-dinitrophenol, 4-methoxyphenol, 1-chloro-2-nitrobenzene, 1,4- phenyl enediamine, N,N'-bis(1,4-dimethylpentyl)-paraphenylenediamine, N,N-bis(isopropyl)paraphenylenediamine, N,N'-bis(methyl)paraphenylenediamine, 2,5-di(tertamyl)hydroquinone, N,N'-bis(1-methylheptyl)paraphenylenediamine, 1,4-dinitrobenzene, 2,6-dibromophenoxy acetic acid, 2,4-bibromophenoxy acetic acid, 2-aminobenzoic acid, 4-aminobenzoic acid, 1,3-benzenedicarboxylic acid, 1,4-benzenedicarboxylic acid and [(2,4-dibromophenoxy)-methyl]oxirane.

Illustrative examples of satisfactory permeation modifiers of formula (b) are 4,4'-diaminobenzophenone, 2,2'-diaminobenzophenone, 2',4-diaminobenzophenone, 4,4'-dimethylaminobenzophenone, 4,4'-dichlorobenzophenone, 4,4'-dibromobenzophenone, 4,4'-dinitrobenzophenone, 2,2'-dinitrobenzophenone, 2,4,4'-trihydroxybenzophenone, 3-phenoxy-1,2-benzenediol, 4-phenoxy-1,3-benzenediol, 4(4-hydroxyphenoxy)-1,3-benzenediol, 2(4-hydroxyphenoxy)1-hydroxy-5-methoxybenzene, 1,1'-oxybis(2-hydroxy-4-methoxybenzene), 1,1'-oxybis(3,5-dichloro-4-hydroxybenzene), 4(phenoxy)-2,6-dichlorophenol, 2(2,5-dichlorophenoxy)benzeneamine, 3(4-chlorophenoxy)nitrobenzene, 4(2,5-dichlorophenoxy)nitrobenzene, 1,1'-oxybis(4-chlorobenzene), 1,1'-oxybis(4-methoxybenzene), 1,1'-thiobis(2,4-dihydroxybenzene), 4(4-hydroxyphenylthio)-1,3-benzenediol, 1,1'-oxybis (2,4-dihydroxybenzene), 1,1'-thiobis (2,4-dihydroxybenzene), 1,1-oxybis(4-nitrobenzene), 1,1'-thiobis(4-nitrobenzene), 4-4'-oxybis-(N-methylbenzeneamine, 4,4'-thiobis(6-tert-butyl-m-cresol), 4,4'-thiobis(benzeneamine), and corresponding dithio compounds.

Additional examples include 2-methyl-4[(4-methylphenyl)methyl] 1,3-benzenediol, 4(1-methyl-1-phenylethyl) 1,2-benzenediol, 4,4'-(1-methyl-1,2-ethanediyl)diphenol, 2-(3-aminophenylmethyl)benzeneamine, 1-chloro-2(4-chlorophenoxy)benzene, 1,3-dichloro-2-phenoxy-benzene, 4,4'-butylidenebis(6-tert-butyl-m-cresol), 2,4-dichloro-1-phenoxy-benzene, and 1,1'-oxybis(2-chloro benzene).

In accordance with another embodiment of this invention, improved asymmetric membrane for gas separation is obtained by modifying said asymmetric membrane by an effective amount to increase the gas separation factor of the asymmetric membrane, by a permeation modifier of the formula (c):

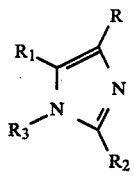

(c)

where R, $R_1$, $R_2$, and $R_3$ are independently hydrogen, alkyl, alkenyl or aryl.

Illustrative examples of permeation modifiers of formula (c) include imidazole, N-vinyl imidazole, 4-phenyl imidazole, 2-ethyl-imidazole, 2-ethyl-4-methyl-imidazole, and the like.

The modified membranes of the invention are especially suited for separations of gaseous mixtures comprising hydrogen, carbon monoxide, carbon dioxide, helium, nitrogen, oxygen, argon, hydrogen sulfide, nitrous oxide, ammonia, and hydrocarbon gases of 1 to about 5 carbon atoms, for exmaple, methane, ethane, and propane. The modified membranes are particularly suitable for separating hydrogen from gaseous mixtures containing any of the aforementioned gases. The modified membranes are particularly effective for a gas mixture comprising two or more gases, one of which being selected from hydrogen, helium, ammonia and carbon dioxide and the other being selected from carbon monoxide, nitrogen, argon, methane and ethane.

The modified membranes of the invention are particularly useful for separating hydrogen from carbon monoxide, carbon dioxide from hydrocarbon gases such as methane and ethane, oxygen from air, ammonia from hydrogen, nitrogen, methane or argon singly or together, carbon dioxide from carbon monoxide, hydrogen sulfide from hydrocarbon gases of 1–5 carbon atoms, helium from hydrocarbon gases, and carbon monoxide from hydrogen, helium, nitrogen, and hydrocarbon gases.

For better understanding of the permeation modified asymmetric gas separation membranes having graded density skins according to the invention, examples are presented in Tables 1–4. Tables 1–3 include both comparative and inventive references. Table 4 contains comparative examples of unmodified membranes. In these tables, the following abbreviations are utilized:

EMI = 2-ethyl-4-methyl-imidazole
$BzPh(OH)_3$ = 2,4,4'-trihydroxybenzophenone
DER-599 = [(2,4-dibromophenoxy)-methyl]oxirane
    (DER-599 is a product of Dow Chemical Co.)
$cC_6$ = cyclohexane
$CH_3OH$ = methanol
iprOH = isopropanol
FP = 1-formylpiperidine
FA = formamide
TS = total solids
NMP = N-methyl-2-pyrrolidone
PA = propionic acid Percent (%) compositions and ratios of components in mixtures represent weight basis values.

EXPERIMENTAL DETAILS

Fiber Spinning

All of the hollow fibers recorded in the following tables were spun by a standard wet spinning process. Deaerated sol (dope) was delivered at a rate or up to 20 ml/min to a tube-in-orifice type spinnerette. The spinnerette was maintained at a temperature between 15°–100° C. by the application of sufficient heat to maintain adequate sol flow. Water was injected into the fiber lumen at a rate of up to 10 ml/min to form the nascent hollow fiber which was drawn at a rate of up to 100 m/min. The fiber is drawn through water baths maintained at temperatures of up to ambient and above, but less than about 50° C. The hollow fiber is then washed with water. The fiber is then wound onto a bobbin and washed for up to 7 days in running water. Hanks of hollow fibers are then formed by skeining the fiber from the bobbin. These hanks are then hung vertically and dried rapidly at about 100° C.

Permeation modifier treatment of hollow fiber test samples was as follows:

(a) dry hollow fibers were potted into test cells containing either 10 fibers each about 15 cm long, or for larger scale 1"×1' modules ~1000 fibers each about 26–28 cm long, (b) permeation modifier was applied to the hollow fiber membrane surface by immersion of the test cell into a solution of permeation modifier compound in a volatile solvent while vacuum was maintained on the bores of the fibers, during application immersion the temperature of the modifier solution was at ambient (15°–25° C.) and immersion time was 3 minutes duration in the case of small 10 fiber test cells and 6 minutes in the case of larger 1"×1' modules, (c) subsequent to the application step, vacuum pumping on the fiber bores continued for a period of 2–3 hours for small 10 fiber test cells and for a period of 6–8 hours for larger 1"×1' modules, while the external surfaces of the fibers were exposed to ambient air, during which time evaporation of the volatile application solvent was effected, (d) subsequent to the evaporation step, the treated test cells were baked at 60°–70° C. in an oven in air for a period of 1 hour for small test cells and for a period of 2 hours for larger 1"×1' modules, then allowed to cool to room temperature in ambient air, (e) subsequent to the bake step, the samples were coated with 1% solution of Sylgard silicone in isopentane using standard coating techniques, such as immersion of the sample into the coating solution for a period of time ranging from 30 seconds to 15 minutes, while a vacuum was maintained on the bores of the fibers, during coating immersion the coating solution temperature was about ambient (15°–25° C.), (f) subsequent to the coating step, vacuum pumping on the fiber bores was continued for a period of 6–12 hours, during which time the external surfaces of the fibers were exposed to ambient air, such that evaporation of the coating solvent was effected and curing of the silicone was accomplished.

(g) coating-only control samples were prepared as in step (a) and coated as in steps (e) and (f).

Gas transport testing of hollow fiber samples was performed as follows:

For oxygen/nitrogen tests, samples were place in a pressure vessel, and the oxygen and nitrogen flux rates were measured at 50° C. under $2.9 \times 10^4$ Pa using a dry tank air feed. Permeability was calculated using equation:

$$P/l = \frac{Q \times C.F.(14.7 \text{ psi/atm})}{n\pi \, dt\Delta P(76 \text{ cmHg/atm})(60 \text{ sec/min})}$$

where Q=the apparent gas flow reading from the mass flow meter (cm³(STD)/min); CF=a conversion factor for the specific gas to change the apparent flux to the actual flux; n=the number of fibers; d=the outer diameter of the fiber (cm); t=active fiber length; P=the permeability of the skin layer; and l=the thickness of the effective layer; and $\Delta P$=the pressure differential across the membrane.

For helium, nitrogen and hydrogen tests, samples were placed in a pressure vessel and gas flux rates were measured at about ambient temperatures (19°–25° C.) using pure gas feed in each case at a pressure of $4.35 \times 10^4$ Pa. Permeability was calculated by the equation shown above for P/l.

For carbon dioxide/methane/propane ($CO_2/CH_4/C_3H_8$) tests, samples were placed in a pressure vessel and total gas flux rates were measured at 75° C. at a feed pressure of $4.35 \times 10^4$ pa using a mixed gas feed containing about 30% $CO_2$, 66% $CH_4$ and 4% $C_3H_8$. Permeated gas composition was analyzed on a Perkin-Elmer Model Sigma 3B Gas Chromatograph, calibrated using standard gases of known composition. Permeability of each gas is calculated by the equation shown above for P/l, with the modification that permeate flux Q incorporates the fraction of that gas reflected in the GC analysis of permeate composition and the pressure differential $\Delta P$ reflects the transmembrane pressure differential appropriate for each gas of the mixture.

Separation factors $\alpha(x/y)$ for two gases x and y are calculated from the numerical ratio of the permeabilities for each gas:

$$\alpha_y^x = \frac{P/l\,(x)}{P/l\,(y)}$$

Values presented in the tables represent averages of test results for from 2 to 6 replicates under a given set of treatment conditions.

TABLE 1

Asymmetric, Graded Density Skin Polysulfone (P1) Test Loops Permeation Modified[a] Fiber

| | P/l He ($\times 10^{-6}$) | $\alpha_{N_2}^{He}$ | P/l $H_2$ ($\times 10^{-6}$) | $\alpha_{N_2}^{H_2}$ | P/l $CO_2$ ($\times 10^{-6}$) | $\alpha_{CH_4}^{CO_2}$ | $\alpha_{C_3H_8}^{CO_2}$ |
|---|---|---|---|---|---|---|---|
| 0.5% EMI $cC_6/CH_3OH$(98/2) | 99.5 | 146.4 | 131.2 | 192.8 | 80.2 | 12.1 | 160.1 |
| 0.5% EMI $cC_6/CH_3OH$(98/2) | 102.8 | 163.0[b] | 124.2 | 197.1[b] | 80.4 | 12.0 | 184.7[b] |
| 2.0% EMI $cC_6/CH_3OH$(98/2) | 73.4 | 246.6 | 79.6 | 273.6 | 64.4 | 13.0 | 168.3 |
| 2.0% EMI $cC_6/CH_3OH$(98/2) | 44.2 | 250.8[b] | 45.8 | 259.9[b] | 23.0 | 13.3 | 120.0[b] |
| 0.5% BzPh(OH)$_3$ $CH_3OH$ | 69.2 | 153.9 | | | | | |
| 0.5% BzPh(OH)$_3$ $CH_3OH$ | 75.9 | 233.3[c] | | | 38.0 | 15.2 | 228.1[c] |
| 2.0% BzPh(OH)$_3$ $CH_3OH$ | 46.6 | 12.2[c,d] | | | | | |
| 2.0% BzPh(OH)$_3$ $CH_3OH$ | 64.5 | 22.4[c,d] | | | | | |
| 0.5% DER-599 iprOH | 74.4 | 186.9 | | | | | |
| 0.5% DER-599 iprOH | 75.6 | 256.5[c] | | | 51.5 | 11.7 | 64.2[c] |
| 2.0% DER-599 iprOH | 32.1 | 123.8[d] | | | | | |
| 2.0% DER-599 iprOH | 46.1 | 205.3[c] | | | 39.1 | 10.1 | 40.9[c] |
| Henis et al Type Asymmetric Membrane Control (87/13 FP/FA-Solvent System) Coating Only 1% Sylgard | 75.0 | 90.0 | 80.0 | 100.0 | 65.0 | 9.5 | 80.0 |

[a]Udel P-3500 ® 37% TS dope in 57/43 NMP/PA (P1) solvent system, except for controls.
[b]Indicates tests on additional test loops treated as in (a), except longer immersion times (1 minute) were used in the application of the final Sylgard coating.
[c]Indicates test results on samples which received a recoating with 1% Sylgard solution (1 minute immersion).
[d]Low values are due to poor coating adhesion resulting from the strongly polar BzPh(OH)$_3$, or DER-599 at higher concentrations than optimum.

TABLE 2

Asymmetric, Graded Density Skin Polyethersulfone (P1) Test Loops Permeation Modified[a] Fiber

| | P/l He ($\times 10^{-6}$) | $\alpha_{N_2}^{He}$ | P/l $CO_2$ ($\times 10^{-6}$) | $\alpha_{CH_4}^{CO_2}$ | $\alpha_{C_3H_8}^{CO_2}$ |
|---|---|---|---|---|---|
| 0.5% EMI $cC_6/CH_3OH$ (98/2) | 45.7 | 308.2 | 25.8 | 19.6 | 366.0 |
| 2.0% EMI $cC_6/CH_3OH$ (98/2) | 30.3 | 365.9 | 17.6 | 18.7 | 211.0 |
| 0.5% BzPh(OH)$_3$ $CH_3OH$ | 27.5 | 339.8 | 15.6 | 23.7 | $\geq 450.0$[b] |
| 2.0% BzPh(OH)$_3$ $CH_3OH$ | 19.1 | 258.1 | 7.1 | 24.0 | 380.0 |
| 0.5% DER-599 iprOH | 38.1 | 440.3 | 28.3 | 19.1 | 365.0 |
| 2.0% DER-599 iprOH | 23.4 | 336.9 | 24.5 | 15.2[c] | 72.5[c] |
| Henis et al Type Asymmetric Membrane Control (85/15 FP/FA Solvent System) 35% TS Coating Only 1% Sylgard/isopentane | 32.0 | 131.0 | —[d] | —[d] | —[d] |

[a]Victrex ® 600P 40% TS dope in 57/43 NMP/PA (P1) solvent system, except for controls.
[b]Indicates samples where permeate $C_3H_8$ concentration was less than the detection limit of the chromatographic analysis. $\alpha(CO_2/C_3H_8) \geq 450$ was calculated based on the limit of detection value of 0.03% $C_3H_8$ in permeate, thus $\alpha$ of 450 represents a lower limit on $CO_2/C_3H_8$ separation factor.
[c]Low values are due to poor coating adhesion resulting from the strongly polar BzPh(OH)$_3$, or DER-599 at higher concentrations than optimum.
[d]Test data not available under comparable test conditions.

TABLE 3

Asymmetric, Graded Density Skin Polysulfone (P1) 1" × 1' Permeation Modified[a] with 2-Ethyl, 4-Methyl Imidazole (EMI)

| | P/l He ($\times 10^{-6}$) | $\alpha_{N_2}^{He}$ | P/l $O_2$ ($\times 10^{-6}$) | $\alpha_{N_2}^{O_2}$ |
|---|---|---|---|---|
| 0.5% EMI $cC_6/CH_3OH$ (98/2) | 116.3 | 145.0 | 15.1 | 5.5 |
| 0.5% EMI $cC_6/CH_3OH$ (98/2) | 109.6 | 127.5[b] | 14.2 | 5.6[b] |
| 2.0% EMI $cC_6/CH_3OH$ (98/2) | 72.2 | 253.2 | 7.6 | 4.8 |
| 2.0% EMI $cC_6/CH_3OH$ (98/2) | 76.8 | 240.0[b] | 8.6 | 2.6[b,d] |
| Henis et al Type Asymmetric Membrane Control (87/13 FP/FA Solvent System) Coating | 75.0 | 90.0[c] | 12.0 | 5.2[c] |

TABLE 3-continued

Asymmetric, Graded Density Skin Polysulfone (P1) 1" × 1'
Permeation Modified[a] with 2-Ethyl, 4-Methyl Imidazole (EMI)

| | P/l He (× $10^{-6}$) | $\alpha^{He}_{N2}$ | P/l O$_2$ (× $10^{-6}$) | $\alpha^{O2}_{N2}$ |
|---|---|---|---|---|
| Only 1% Sylgard | | | | |

[a] Udel P-3500 ® 37% TS dope in 57/43 NMP/PA (P1) solvent system, except for controls.
[b] Indicates data obtained on the same modules, under the same conditions as in (a), after recoating with 1% Sylgard solution using a 15 minute immersion with bore vacuum.
[c] Controls, not permeation modified.
[d] Coating adhesion problems are more pronounced at higher level of polar modifiers when addressing gas pair of similar molecular size and properties.

TABLE 4

Comparison of Transport Properties for Various Gases for
P1 Versus Henis et al Type Asymmetric Fibers
Without Permeation Modification

| | P/l He (× $10^{-6}$) | $\alpha^{He}_{N2}$ | P/l H$_2$ (× $10^{-6}$) | $\alpha^{H2}_{N2}$ | P/l CO$_2$ (× $10^{-6}$) | $\alpha^{CO2}_{CH4}$ | $\alpha^{CO2}_{C3H8}$ | P/l O$_2$ (× $10^{-6}$) | $\alpha^{O2}_{N2}$ |
|---|---|---|---|---|---|---|---|---|---|
| Polysulfone Udel ® P3500 37% TS | | | | | | | | | |
| P1 43/57 PA/NMP | 170.0 | 91.0 | 258.0 | 126.0 | 145.0 | 9.8 | 85.0 | 43.0 | 5.2 |
| 87/13 FP/FA | 75.0 | 90.0 | 80.0 | 100.0 | 65.0 | 9.5 | 80.0 | 12.0 | 5.2 |
| Polyethersulfone Victrex ® 600 P | | | | | | | | | |
| P1 43/57 PA/NMP 40% TS | 84.0 | 182.0 | —[a] | — | —[a] | — | — | 13.0 | 5.1 |
| 85/15 FP/FA 35% TS | 32.0 | 131.0 | —[a] | — | —[a] | — | — | 2.3 | 3.4[c] |

[a] No data available under comparable test conditions for these samples.
[b] Test data for O$_2$/N$_2$ obtained from 1" × 1' modules containing ~1000 fibers x ~ 26 cm length.
[c] 40% TS polyethersulfone 85/15 NMP/FA.

I claim:

1. A multicomponent gas separation membrane exhibiting significantly enhanced gas separation selectivity and increased permeability comprising:
a preformed asymmetric gas separation membrane having a graded density skin and macrovoid-free morphology comprised of glassy, hydrophobic polymers, the membrane having increased free volume as evidenced by the membrane first heat $T_g$ which is greater than the $T_g$ of a bulk sample of the glassy hydrophobic polymers, the polymers of the membrane having a separation factor for one gas of a gaseous mixture over that of one or more remaining gases of the gaseous mixture which when contacted on one or both sides with an effective amount of a permeation modifier and when combined with a coating in occluding contact with the graded density skin provides a multicomponent gas separation membrane which exhibits a separation factor greater than the determined intrinsic separation factor of the bulk sample of the polymers of the asymmetric separation membrane, greater than the determined separation factor of the preformed asymmetric separation membranes, and greater than the determined intrinsic separation factor of the material of the coating with respect to at least one pair of gases in the mixture.

2. The multicomponent gas separation membrane of claim 1 wherein the effective amount of permeation modifier added to the preformed asymmetric separation membrane provides a multicomponent gas separation membrane having no appreciable loss in physical properties as exemplified by $T_g$ measurement.

3. The multicomponent gas separation membrane of claim 1 wherein the effective amount of permeation modifier added to the preformed asymmetric separation membrane comprises from about 0.01 to about 1% by weight of the membrane.

4. The multicomponent gas separation membrane of claim 3 wherein the effective amount of permeation modifier is distributed in the graded density skin of the preformed asymmetric separation membrane in a non-uniform distribution across the preformed asymmetric separation membrane wall.

5. The multicomponent gas separation membrane according to claim 1 wherein the permeation modifier is physically or chemically combined with the coating material.

6. The multicomponent gas separation membrane of claim 1 wherein the permeation modifier is comprised of one or more component materials.

7. The multicomponent gas separation membrane according to claim 1 wherein the permeation modifier is comprised of an aromatic, rigid, polar material exhibiting antiplasticizing behavior.

8. The multicomponent gas separation membrane of claim 1 wherein the permeation modifier is comprised of an antiplasticizer composition.

9. The multicomponent gas separation membrane of claim 1 wherein the permeation modified asymmetric membrane for gas separation is modified by an effective amount of a permeation modifier of the formula:

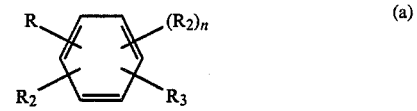

(a)

in which n is one to three, R and R$_1$ independently are hydroxy, chloro, bromo, amino, alkylamino, dialkylamino, nitro, alkoxy, hydroxyalkyl, hydroalkoxy, carboalkoxy, carboxyalkoxy, or glycidylocy, and R$_2$ and R$_3$ independently are hydrogen or alkyl, or;

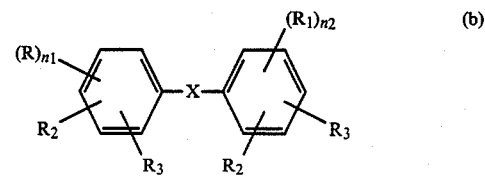

(b)

in which R, R$_1$, R$_2$ and R$_3$ are the same as in the formula (a), X is oxygen, sulfur, dithio, carbonyl, alkylene or cycloalkylene, and $n_1$ and $n_2$ are zero to three with the proviso that the sum of $n_1$ and $n_2$ is at least two.

10. The multicomponent gas separation membrane of claim 1 wherein the permeation modified asymmetric membrane for gas separation is modified by an effective amount of a permeation modifier of the formula:

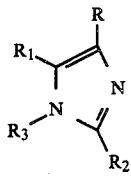

where R, $R_1$, $R_2$ and $R_3$ are independently hydrogen, alkyl, alkenyl or aryl.

11. A permeation modified asymmetric gas separation membrane having a graded density skin and macrovoid-free morphology comprised of glassy, hydrophobic polymers, the membrane having increased free volume as evidenced by the membrane first heat $T_g$ which is greater than the $T_g$ of a bulk sample of the glassy, hydrophobic polymers, the membrane having been contacted on the graded density skin with an effective amount of a permeation modifier and when combined with a coating in contact with the graded density skin exhibits a separation factor greater than the intrinsic separation factor of a dense membrane of the bulk sample of the polymers for one gas of a gaseous mixture.

12. The multicomponent gas separation membrane of claim 11 wherein the effective amount of permeation modifier added to the preformed asymmetric separation membrane provides a multicomponent gas separation membrane having no appreciable loss in physical properties as exemplified by $T_g$ measurement.

13. The multicomponent gas separation membrane of claim 11 wherein the effective amount of permeation modifier added to the preformed asymmetric separation membrane comprises from about 0.01 to about 1% by weight of the membrane.

14. The multicomponent gas separation membrane of claim 11 wherein the effective amount of permeation modifier is distributed in the graded density skin of the preformed asymmetric separation membrane in a nonuniform distribution across the preformed asymmetric separation membrane wall.

15. The multicomponent gas separation membrane according to claim 11 wherein the permeation modifier is physically or chemically combined with the coating material.

16. The multicomponent gas separation membrane of claim 11 wherein the permeation modifier is comprised of one or more component materials.

17. The multicomponent gas separation membrane according to claim 11 wherein the permeation modifier is comprised of an aromatic, rigid, polar material exhibiting antiplasticizing behavior.

18. The multicomponent gas separation membrane of claim 11 wherein the permeation modified asymmetric membrane for gas separation is modified by an effective amount of a permeation modifier of the formula:

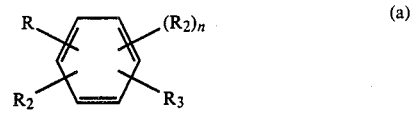

in which n is one to three, R and $R_1$ independently are hydroxy, chloro, bromo, amino, alkylamino, dialkylamino, nitro, alkoxy, hydroxyalkyl, hydroalkoxy, carboalkoxy, carboxyalkoxy, or glycidylocy, and $R_2$ and $R_3$ independently are hydrogen or alkyl, or;

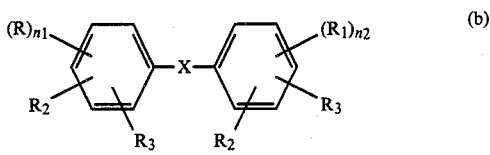

in which R, $R_1$, $R_2$ and $R_3$ are the same as in the formula (a), X is oxygen, sulfur, dithio, carbonyl, alkylene or cycloalkylene, and $n_1$ and $n_2$ are zero to three with the proviso that the sum of $n_1$ and $n_2$ is at least two.

19. The multicomponent gas separation membrane of claim 11 wherein the permeation modified asymmetric membrane for gas separation is modified by an effective amount of a permeation modifier of the formula:

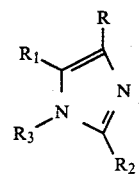

where R, $R_1$, $R_2$ and $R_3$ are independently hydrogen, alkyl, alkenyl or aryl.

20. A permeation modified asymmetric gas separation membrane comprised of a coating in occluding contact with a graded density skin of an asymmetric membrane which has macrovoid-free morphology and is comprised of glassy, hydrophobic polymers, the graded density skin being characterized as having an active layer and a transition layer which communicates with the active layer and a porous substrate of the membrane, wherein all three provide increased free volume to the membrane as evidenced by the membrane first heat $T_g$ which is greater than the $T_g$ of a bulk sample of the glassy, hydrophobic polymers, the membrane having been contacted on the graded density skin with an effective amount of a permeation modifier, the permeation modified membrane exhibits a separation factor greater than the determined intrinsic separation factor of a dense membrane of the bulk sample of the polymers for one gas of a gaseous mixture and an increase in permeability for the one gas of the gaseous mixture when compared to unmodified asymmetric membranes of the same polymers having uniform skins and coated with the same coating materials.

21. The multicomponent gas separation membrane of claim 20 wherein the effective amount of permeation modifier added to the preformed asymmetric separation membrane provides a multicomponent gas separation membrane having no appreciable loss in physical properties as exemplified by $T_g$ measurement.

22. The multicomponent gas separation membrane of claim 20 wherein the effective amount of permeation modifier added to the preformed asymmetric separation membrane comprises from about 0.01 to about 1% by weight of the membrane.

23. The multicomponent gas separation membrane of claim 20 wherein the effective amount of permeation modifier is distributed in the graded density skin of the preformed asymmetric separation membrane in a non-uniform distribution across the preformed asymmetric separation membrane wall.

24. The multicomponent gas separation membrane according to claim 20 wherein the permeation modifier is physically or chemically combined with the coating material.

25. The multicomponent gas separation membrane of claim 20 wherein the permeation modifier is comprised of one or more component materials.

26. The multicomponent gas separation membrane according to claim 20 wherein the permeation modifier is comprised of an aromatic, rigid, polar material exhibiting antiplasticizing behavior.

27. The multicomponent gas separation membrane of claim 20 wherein the permeation modified asymmetric membrane for gas separation is modified by an effective amount of a permeation modifier of the formula:

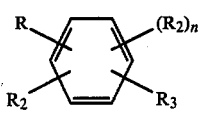

(a)

in which n is one to three, and R and $R_1$ independently are hydroxy, chloro, bromo, amino, alkylamino, dialkylamino, nitro, hydroxyalkyl, hydroalkoxy, carboalkoxy, carboxyalkoxy, or glycidylocy, and $R_2$ and $R_3$ independently are hydrogen or alkyl, or;

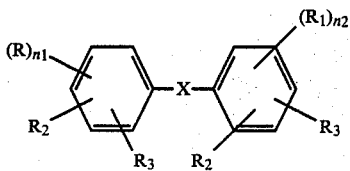

(b)

in which R, $R_1$, $R_2$ and $R_3$ are the same as in the formula (a), X is oxygen, sulfur, dithio, carbonyl, alkylene or cycloalkylene, and $n_1$ and $n_2$ are zero to three with the proviso that the sum of $n_1$ and $n_2$ is at least two.

28. The multicomponent gas separation membrane of claim 20 wherein the permeation modified asymmetric membrane for gas separation is modified by an effective amount of a permeation modifier of the formula:

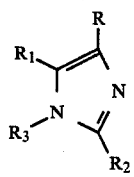

where R, $R_1$, $R_2$ and $R_3$ are independently hydrogen, alkyl, alkenyl or aryl.

29. A process for producing a multicomponent gas separation membrane exhibiting significantly enhanced separation selectivity and increased permeabilities comprising the steps:

(a) producing an asymmetric gas separation membrane having a graded density skin and macrovoid-free morphology which is comprised of glassy, hydrophobic polymers, the membranes having increased free volume as evidenced by the membrane first heat $T_g$ which is greater than the $T_g$ of the bulk sample of the glassy, hydrophobic polymers, the polymers having a separation factor for one gas of a gaseous mixture over that of one or more remaining gases of the gaseous mixture;

(b) contacting the asymmetric separation membrane on the graded density skin with an effective amount of a permeation modifier; and (c) coating the permeation modified, preformed, asymmetric separation membrane with a coating which forms onto the membrane in occluding contact, the material of the coating exhibiting a determined intrinsic separation factor which is less than the determined intrinsic separation factor of the bulk sample of the polymers of the asymmetric membrane.

30. The process according to claim 29 wherein the effective amount of permeation modifier added to the preformed membrane provides a permeation modified, asymmetric gas separation membrane having no appreciable changes in physical properties as, for example, a loss in $T_g$.

31. The process according to claim 29 wherein the effective amount of permeation modifier added to the membrane comprises from about 0.01 to about 1.0 percent by weight of the membrane.

32. The process according to claim 29 wherein the effective amount of permeation modifier is distributed onto the graded density skin surface of the preformed membrane resulting in a non-uniform distribution across the wall of the preformed graded density skin asymmetric gas separation membrane.

33. The process according to claim 29 wherein the permeation modifier is comprised of one or more component materials.

34. The process according to claim 29 wherein the permeation modifier is comprised of an antiplasticizer composition.

35. The process according to claim 29 wherein the permeation modifier is comprised of an aromatic, rigid, polar material exhibiting antiplasticizing behavior.

36. The process according to claim 29 wherein the permeation modified membrane is a preformed graded density skin, asymmetric gas separation membrane modified by an effective amount of a permeation modifier having the formula:

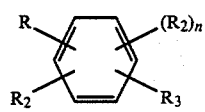

(a)

in which n is one to three, and R and $R_1$ independently are hydroxy, chloro, bromo, amino, alkylamino, dialkylamino, nitro, alkoxy, hydroaxyalkyl, hydroalkoxy, carboalkoxy, carboxyalkoxy, or glycidylocy, and $R_2$ and $R_3$ independently are hydrogen or alkyl, or;

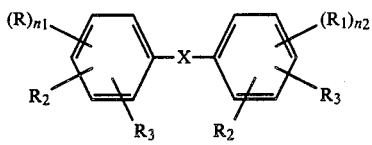 (b)

in which R, $R_1$, $R_2$ and $R_3$ are the same as in the formula (a), X is oxygen, sulfur, dithio, carbonyl, alkylene or cycloalkylene, and $n_1$ and $n_2$ are zero to three with the proviso that the sum of $n_1$ and $n_2$ is at least two.

37. The process according to claim 29 wherein the permeation modified membrane is comprised of a preformed graded density skin, asymmetric gas separation membrane modified by an effective amount of a permeation modifier having the formula:

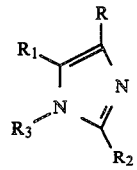

where R, $R_1$, $R_2$ and $R_3$ are independently hydrogen, alkyl, alkenyl or aryl.

* * * * *